United States Patent
Günther et al.

(10) Patent No.: US 10,763,472 B2
(45) Date of Patent: Sep. 1, 2020

(54) BATTERY HOUSING

(71) Applicant: Kirchhoff Automotive Deutschland GmbH, Attendorn (DE)

(72) Inventors: Alexander Günther, Olpe (DE); Marco Töller, Cologne (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 353 days.

(21) Appl. No.: 15/745,648

(22) PCT Filed: Oct. 12, 2017

(86) PCT No.: PCT/EP2017/076124
§ 371 (c)(1),
(2) Date: Jan. 17, 2018

(87) PCT Pub. No.: WO2018/082897
PCT Pub. Date: May 11, 2018

(65) Prior Publication Data
US 2019/0036092 A1 Jan. 31, 2019

(30) Foreign Application Priority Data
Nov. 2, 2016 (DE) .......................... 10 2016 120 828

(51) Int. Cl.
*H01M 2/10* (2006.01)
*H01M 2/02* (2006.01)
*H01M 2/12* (2006.01)

(52) U.S. Cl.
CPC ......... *H01M 2/1077* (2013.01); *H01M 2/024* (2013.01)

(58) Field of Classification Search
CPC ............ H01M 2/10; H01M 2/02; H01M 2/12; H01M 2/08
See application file for complete search history.

(56) References Cited

U.S. PATENT DOCUMENTS 602,302 A * 4/1898 Brougham .............. B60R 16/04
180/65.1
929,118 A * 7/1909 Buckwalter ............. B60R 16/04
180/68.5

(Continued)

FOREIGN PATENT DOCUMENTS

CN 102092267 A 6/2011
CN 104659291 A 5/2015

(Continued)

OTHER PUBLICATIONS

International Search Report dated Nov. 30, 2017 in parent international application PCT/EP2017/076124.

(Continued)

*Primary Examiner* — Kenneth J Douyette
(74) *Attorney, Agent, or Firm* — Polson Intellectual Property Law, PC; Christopher Sylvain; Margaret Polson (57) ABSTRACT

A battery housing for a vehicle driven by an electric motor comprises a tray part including a bottom and side walls integrally formed thereon, and furthermore comprises a frame structure surrounding the tray part on the outside, wherein a gap remains between the side walls and the frame structure disposed on the outside thereof. At least two side walls of the tray part located opposite one another with respect to the tray volume each have at least one embossment, which is designed to point away from the tray volume and is supported on the frame structure. A brace disposed in the tray part is supported with the end-face ends thereof in the mutually opposing embossments.

17 Claims, 5 Drawing Sheets

(56) References Cited

U.S. PATENT DOCUMENTS

| | | | | |
|---|---|---|---|---|
| 1,332,561 | A | * | 3/1920 | MacRae ............... B60K 17/145 |
| | | | | 180/214 |
| 1,338,690 | A | * | 5/1920 | Moorman ........... H01M 2/1083 |
| | | | | 180/68.5 |
| 1,364,358 | A | * | 1/1921 | Edison ................ H01M 2/1072 |
| | | | | 429/159 |
| 2,035,066 | A | * | 3/1936 | Havas ..................... B60R 16/04 |
| | | | | 180/68.5 |
| 2,519,052 | A | * | 8/1950 | Krachenfels ............ H01M 6/46 |
| | | | | 429/153 |
| 2,947,373 | A | * | 8/1960 | Wilson .................... B60R 16/04 |
| | | | | 180/68.5 |
| 4,327,809 | A | * | 5/1982 | Fenstermaker ......... B60R 16/04 |
| | | | | 180/68.5 |
| 10,424,770 | B2 | | 9/2019 | Günther |
| 2011/0143179 | A1 | | 6/2011 | Nakamori |
| 2019/0229311 | A1 | | 7/2019 | Günther |
| 2019/0252741 | A1 | | 8/2019 | Günther |
| 2019/0259994 | A1 | | 8/2019 | Günther |
| 2019/0273231 | A1 | | 9/2019 | Günther |
| 2019/0381899 | A1 | | 12/2019 | Günther |

FOREIGN PATENT DOCUMENTS

| | | |
|---|---|---|
| DE | 202016102223 U1 | 5/2016 |
| EP | 2332761 A1 | 6/2011 |
| EP | 2685523 A1 | 1/2014 |
| JP | 2009266653 A | 11/2009 |

OTHER PUBLICATIONS

Written Opinion of the International Searching Authority dated Nov. 30, 2017 in parent international application PCT/EP2017/076124.
Office Action dated Jun. 3, 2020 in related Chinese application 201780002893.5.

* cited by examiner

BATTERY HOUSING

BACKGROUND

The present disclosure relates to a battery housing for a vehicle driven by an electric motor, comprising a tray part having a bottom and side walls integrally formed thereon, and furthermore comprising a frame structure surrounding the outside of the tray part, wherein a gap remains between the side walls and the frame structure disposed on the outside thereof.

Vehicles driven by electric motors, such as passenger cars, industrial trucks or the like, use battery modules as power storage devices. Such battery modules are typically composed of a plurality of individual batteries. These batteries are what are known as high-voltage batteries. The accommodation of such battery modules necessary for operating such a vehicle is subject to certain requirements. It is essential that the battery module is, or the battery modules are, protected against outside conditions in the battery housing. In particular, these must meet the necessary safety requirements when exposed to crash-induced applied loads.

DE 20 2016 102 223 U1 discloses a battery housing comprising a tray part and a cover part detachably connected to the tray part. The two parts comprise an outwardly projecting mounting flange extending around the circumference on the mutually facing sides thereof.

A tray part for a battery housing can be produced cost-effectively by deep drawing a steel blank, for example. This causes the side walls integrally formed on the bottom of the tray part to be integrally formed on the bottom, forming a draft angle. This means that the side walls include an angle with the bottom which is a few degrees greater than 90°. Customarily, draft angles are approximately 3°. When such a configuration of the side walls is present, these include an angle with the bottom of 93°. This is necessary to be able to pull the molding tool out of the molded battery volume after the molding process.

In order to provide mechanical protection for the battery housing, and in particular for the battery module or battery modules accommodated therein, the tray part is or the tray parts are surrounded by a frame structure, which is disposed on the outer side with respect to the side walls. Such a frame structure is formed of individual profile sections assembled to form a frame profile. A battery housing comprising such a tray part is known from US 2011/0143179 A1. Light metal hollow chamber profiles extruded for weight savings purposes, and typically extruded aluminum profiles, are used as profile sections. The outer contour of the tray part in the region of the upper termination of the side walls thereof and the inside width of such a frame part are matched to one another. For cost reasons, it is standard procedure to use hollow chamber profile sections, in particular such that have a rectangular cross-sectional geometry. The inner side of the frame profile is supported on the outer side of the side walls of the tray part in the upper end section thereof, and more particularly directly below the transition of the side wall into the mounting flange projected outwardly therefrom. The mounting flange then rests on the upper side of a profile section of the frame profile. As a result, a gap is present between the outer side of the side walls and the outer side of the provided frame structure due to the inclined arrangement of the side walls.

The frame structure is provided to absorb impact, such as that which occurs during a collision, for example. The frame structure is thus intended to protect the battery volume present in the tray part against damage at least to a certain degree. At times, longitudinal and transverse braces are disposed in the tray volume for reinforcement purposes, the end faces of these braces being supported on the surfaces of the mutually facing side walls. Due to the inclined orientation of the side walls, the ends of such braces must be mitered at an angle that is complementary to the draft angle so that the end surfaces thereof rest against the side wall across the full surface of the end surfaces. These braces are provided to reinforce the tray part. The impact energy acting laterally on a profile section of such a frame profile in the event of a collision is transferred on to the side facing away from the impact via the brace or braces extending in the direction of the impact. This typically acts against an abutment. Finishing the ends of the braces used is a complex aspect of this concept. Moreover, it has been shown that the action of a force into the braces across the full surface only takes place when the profile section of the frame part receiving the impact has already been deformed to a certain degree.

Moreover, attaching the braces in the tray part is quite problematic. It is desirable that the ends of the braces are welded to the side walls. Due to the high heat input during welding, however, this causes significant warpage of the tray part. While it is possible to eliminate such warpage again in a subsequent straightening process, this necessitates an additional process step during production.

The foregoing examples of the related art and limitations therewith are intended to be illustrative and not exclusive. Other limitations of the related art will become apparent to those of skill in the art upon a reading of the specification and a study of the drawings.

SUMMARY

Proceeding from the foregoing, an aspect of the present disclosure is to refine a battery housing of the type described above in such a way that the tray part is not only cost-effective to produce, taking the stability requirements placed thereon into consideration, but that moreover the crash performance is improved. The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

According to the present disclosure, a battery housing of the type in question and described above is provided in which at least two side walls of the tray part, which are situated opposite one another with respect to the tray volume, each comprise at least one embossment, which is designed to point away from the tray volume and is supported on the frame structure, and in which a brace disposed in the tray part is supported with the end-face ends thereof in the mutually opposing embossments.

On this battery housing, embossments are provided on at least two mutually opposing side walls. The embossments are designed to point away from the tray volume and extend across a certain side wall section. The side wall section integrated in the embossment can extend across the entire height of the side wall or be matched to the height of the end face of a brace to be supported in such an embossment. In the longitudinal extension of the side wall, the embossment is adapted to the respective extension of the end face of the brace supported therein, and consequently has a slightly larger dimension than the respective extension of the end face of the brace at the end. The end-side end face of the brace can be provided by the cross-sectional profile of the brace. It is also certainly possible to bend the mutually opposing side walls of such a brace toward the outside in order to form mounting or support flanges. In such an embodiment, the contour of the brace, with the flared flanges thereof, forms the end face at the end.

Depending on the desired connection of the end-side end faces of a brace to such an embossment, a curved transition region between the side wall and the bottom of the tray part may remain unaffected by the embossment. In another embodiment, the embossment extends to the bottom, so that the bottom of the embossment includes a right angle with the bottom of the tray part with only a small transition radius.

The embossments are supported on the frame structure surrounding the same on the outer side, and consequently form support extensions with respect to the particular side wall, which otherwise is not supported on the frame structure. The fact that the embossments are supported on the frame structure, the support being adapted to the particular extension of the brace supported thereon with respect to the longitudinal extension of the particular side wall, positively influences the process of joining the end-side end face on the embossed side wall section. The surrounding frame structure on the outer side, which on the outer side rests against the embossment, forms a heat sink, whereby warping of the tray part caused by the welding of the end-side end face of a brace to the side wall is avoided. Subsequent straightening is thus no longer necessary. These embossments being supported on the circumferential frame structure also positively influence the crash performance. Impact acting on the frame structure is initially absorbed via the braces supported in the embossments. These must first become deformed to a certain degree, before the gap present between the frame structure and the side wall of the tray part is closed and the side wall in the non-embossed side wall sections is deformed. In this respect, the embossments supported on the surrounding frame structure create energy-absorbing crash structures, whereby damage to battery modules accommodated in the tray part is only possible when a certain extent of energy has already been dissipated due to the deformation of the embossment and the brace supported therein. In some embodiments, the side wall material connecting the bottom of the embossment with the adjoining non-embossed side wall sections includes an obtuse angle, typically an angle of 120° or more, with the adjoining side wall sections. This enables energy-absorbing re-deformation of the embossment in the event of a collision against the outer side of the frame structure, without resulting in denting directed toward the tray interior. As a result, this measure also protects battery modules accommodated in the tray volume.

It is also advantageous to leave a gap between the side walls of the tray part and the surrounding frame structure when the two parts are produced from differing materials, for example the tray part being a steel sheet component and the frame structure being assembled from aluminum profiles. The contact surface between these two components is then minimized, whereby there is no risk of a material-related occurrence of corrosion due to the difference in materials, or this risk may be counteracted more easily.

In one embodiment of the battery housing according to the present disclosure, the embossment is designed so that the embossed side wall section, in contrast to the non-embossed side wall sections, is disposed at a right angle relative to the bottom of the tray part. Consequently, no draft angle is present in the embossed side wall section. Such an embossment can be formed in a step that follows the shaping of the tray part by way of deep drawing. However, an embodiment in which the embossment is already integrally formed from a sheet metal blank as part of the shaping process of the tray part is preferred. Even though the side wall section bordered by the embossment does not have a draft angle, this side wall section is sufficiently short to allow a molding tool to be readily pulled out of the molded tray part. In this way, no additional step for introducing the embossments in the side walls is necessary. Moreover, it is possible to implement narrower tolerances within the embossments. Compared to an embodiment having no embossment, this is the case due to a stiffer surface area.

When the frame structure is embodied by a frame profile that is assembled from individual profile sections, the embossed side wall sections then rest against the surface pointing toward the outer side of the side walls of the tray part. As a result, it is possible to transfer the load into the bottom of the tray part, without the profile section previously absorbing the impact and the side wall resting thereon only with the upper termination thereof having been deformed. Assuming a height of the tray part of 150 mm and a draft angle of 3 degrees, without the concept of the present disclosure it would not be possible to dissipate the impact into the bottom of the tray part until after the side wall has deformed by 8 mm. This is in particular worth mentioning since various automobile manufacturers tolerate penetration depths of only up to 5 mm. For this reason, such a tray part exhibits considerably improved crash performance compared to conventional tray parts. However, it is also conceivable to provide a small, substantially-uniform distance between the outer side of the side wall of the tray part and the frame profile in this area. Essentially, it is important that a force introduction can take place evenly across the entire cross-sectional surface area in this section in the event of a collision. It has even been found in this case that warpage caused by the heat input during welding is already reduced by way of the reinforced local joining surfaces in the form of the embossments. This means that the embossment alone already largely prevents warping, and heat dissipation is not necessarily required. It goes without saying that warpage caused by the heat input during welding can be additionally counteracted by dissipating heat into the frame structure on the mounting flange side. As a result, the embossment offers two advantages. On the one hand, no further work step in the form of an introduced miter on the respective brace ends is required, and on the other hand, the introduced heat does not have any warpage-enhancing effect.

In order to enable improved introduction of the impact from all directions, it is provided in one embodiment that all mutually opposing side walls comprise at least one such embossment. It is certainly possible for the mutually opposing side walls to also comprise multiple, mutually-spaced embossments. This is useful when the length of the side wall of the tray part is larger. This will then be selected as a function of the desired reinforcement. The embossments of the opposing side walls are typically mirror-symmetrical with respect to the tray part transverse plane situated between these side walls. In such a case, the embossments are particularly suitable for ensuring that the end face of a transverse brace is supported therein. This additionally improves the protection of the battery module in the event of a crash. In case of a collision, the transverse brace then has an additional deformation path available, as compared to the regions of the side wall of the tray part that are designed without embossment and adjoin thereon. In other words, in the event of penetration the battery module is, or the battery modules are, also protected for a longer period against damage by this additionally available deformation path as compared to conventional designs. Since the embossed side wall section includes a right angle with the bottom, it is not necessary to miter the end face of such a brace. Any impact that is received from the adjoining profile section of the frame profile is then directly coupled into the end face of the brace across the full surface, and is transferred, without deformation of the side wall of the tray part. In this regard, the mutually opposing embossments of the side walls at the same time provide effective and improved anchoring for braces to be disposed in the tray part, and more particularly regardless of whether these are transverse or longitudinal braces.

The embossments are not only suitable for supporting the end surfaces of the braces on the embossed side wall sections, but also allow these to be welded to the side walls in the embossment, without having to tolerate any noteworthy warpage. Considering the experiences made with conventional tray parts, this was surprising. The heat-induced warpage, which need not be tolerated, on the significantly reinforced local joining surfaces is addressed in the form of the embossments or considerably improved heat dissipation due to potential contact with the frame structure.

In addition to the aspects and embodiments described above, further aspects and embodiments will become apparent by reference to the accompanying drawings and the detailed description forming a part of this specification.

BRIEF DESCRIPTION OF THE DRAWINGS

The present disclosure is described hereafter based on illustrated embodiments with reference to the accompanying figures. In the drawings.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting.

Also, the terminology used herein is for the purposes of description and not limitation.

DETAILED DESCRIPTION

Figure 1:
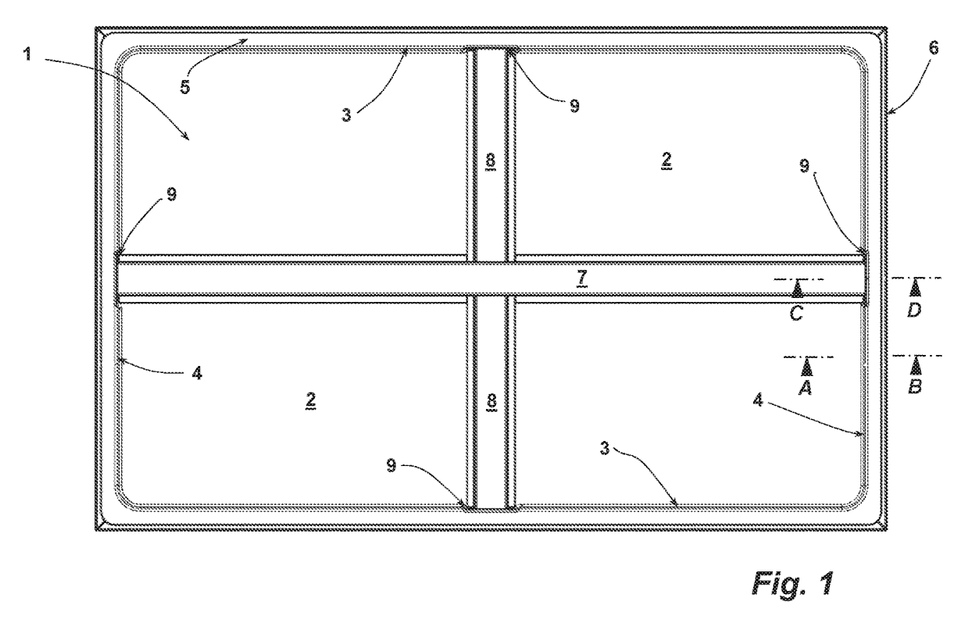
FIG. 1: shows a top view onto the tray part of a battery housing comprising a frame structure surrounding the same.

A tray part 1 of a battery housing (not shown in greater detail) is a part that is deep-drawn from a steel blank in FIG. 1. Even though this is not shown, a tray part that is produced by way of bent components and subsequent welding may also be used. The tray part 1 comprises a bottom 2 and side walls 3, 4 integrally formed thereon, wherein the side walls 3 are the longitudinal side walls and the side walls 4 are the transverse side walls. The side walls 3, 4 are integrally formed on the bottom 2, forming a draft angle. A mounting flange 5, which is disposed in order to point outwardly and thus away from the tray volume, is integrally formed on the upper termination of the side walls 3, 4. The mounting flange 5 is used to join the tray part 1 to a cover part (not shown), wherein a circumferential seal is disposed between the mounting flange 5 of the tray part 1 and that of the cover part. The two parts are braced with respect to one another in order to close battery modules accommodated in the tray part 1 in a moisture-proof manner.

The tray part 1 is surrounded by a frame profile 6, which forms a frame structure. The frame profile 6 proper is composed of four individual hollow chamber profile sections. The profile sections are extruded aluminum profiles. These profile sections are mitered at the ends thereof and welded together in order to form the frame profile 6.

A longitudinal brace 7, which at the ends thereof is supported on the side walls 4, and a cross brace 8, which at the ends thereof is supported on the side walls 3 and extends through the longitudinal brace 7 by way of an introduced recess (not shown), are inserted into the tray part 1. It is conceivable here that only one or both of the braces 7 and 8 are appropriately recessed in the joining region thereof and joined to one another by way of a plug connection, for example. The longitudinal brace 7 and the cross brace 8 of the depicted embodiment have a U-shaped profile, wherein the backs of the braces 7, 8 point upwardly. Due to the continuous extension of the two braces 7 and 8, it is possible to continuously transmit the force that is introduced into the side wall during a penetration from this side wall to the respective opposing side wall.

Not shown in this connection is furthermore one embodiment in which a separating brace is inserted into the tray part 1, the separating brace being supported on the side walls at the ends thereof, as well as two braces that extend transversely thereto and are separated from one another by this separating brace. The mutually separated braces are each supported with the end-side end faces thereof on the inner side of a lateral surface, and with the other ends thereof on the outer side of the separating brace extending between them. However, in the transition region of the two mutually separated braces it is then necessary to introduce one or more joining or reinforcing elements into the separating brace, which ensure continuous force transmission from one side wall of the tray part into the respective opposing side wall. This is important since, in the event of a collision, this is the only way to ensure continuous force transmission from one side wall to the other, and thus to ensure support. Otherwise, if a load were transferred into one of the two separate braces, this brace would only be supported on the outer side of the separating brace and deform the same. The deformation region inside the battery housing and the battery modules would thus not be provided with sufficient protection in the event of a collision.

Another embodiment, which is likewise not shown, is one in which all braces do not continuously extend from one side wall to the other, but are joined to one another by way of a joining element, for example a tie element, in such a way that continuous load transmission from one side wall to the other, and thus support, is provided when a force is applied in the event of a collision.

In the mutually opposing side walls 3 or 4, embossments 9, which extend across a certain section of the respective side wall 3, 4, are present on opposing positions with respect to the tray part cross plane situated in each case between the side walls 3 and 4. In the depicted embodiment, the length of such a side wall section 10 of an embossment 9 approximately corresponds to the width of a brace 7 or 8, plus the weld seam width if necessary, discernible from FIG. 1. The embossments 9 are designed to increase the tray volume, and more particularly such that the embossed wall sections include an angle of 90° with the bottom 2 of the tray part 1. Due to the formation of a draft angle, the non-embossed side wall sections include an angle of 93° with the bottom 2. The embossments are typically designed with a radius of less than 10 mm. In the depicted embodiment, the radius is approximately 5 mm.

It shall furthermore be pointed out here that, due to the introduced embossments, it is even possible for the draft angle to be designed to be larger than 3 degrees, and even a larger distance can be compensated for, without observing any impairment in the crash properties. Rather, this enables multifaceted design options.

Figure 2:
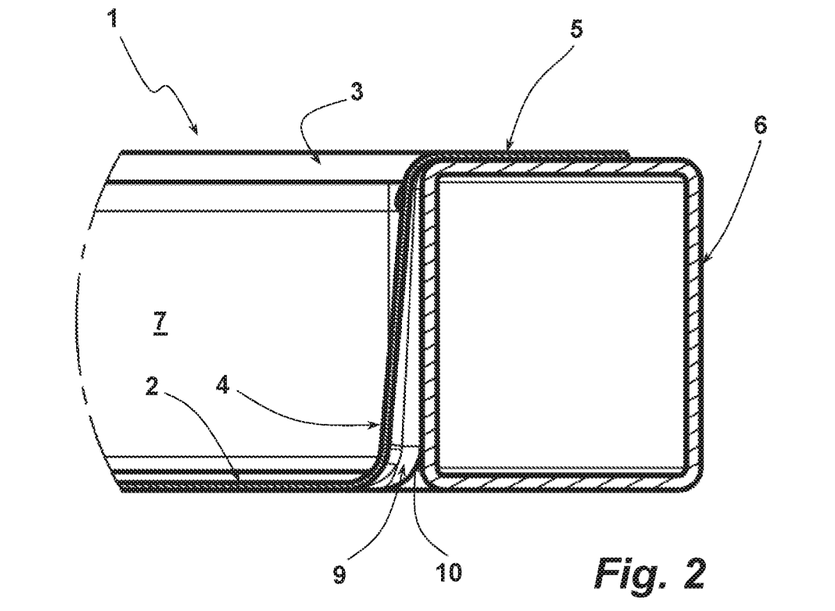
FIG. 2: shows a detailed longitudinal sectional view through the tray part of FIG. 1 along line A-B.
Figure 3:
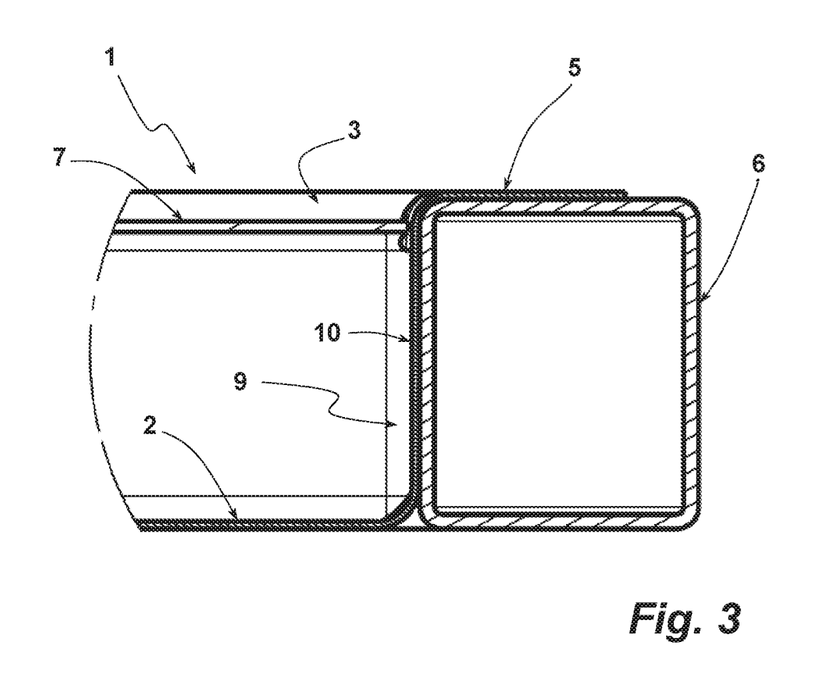
FIG. 3: shows a detailed longitudinal sectional view through the tray part of FIG. 1 along line C-D.

The partial cross-section of FIG. 2 illustrates the transition from the side wall 3, having an inclined arrangement for forming a draft angle, to the embossment 9. Due to the embossment 9, the gap otherwise present between the outer side of the side wall 3 and the outer side of the frame profile 6 pointing to this wall is closed across the extension of the embossment. The outer side of the embossed side wall section 10, this being the bottom of the embossment 9, rests against the adjoining surface of the frame profile 6 across the full surface area. The partial cross-sectional illustration of FIG. 3 shows this contact of the embossed side wall section 10 with the surface of the frame profile 6 adjoining on the outer side. The engagement of the end of the longitudinal brace 7 into the embossment 9 is also apparent from this figure. The illustration of FIG. 3, showing the engagement of the longitudinal brace 7, clarifies that this engages in the embossment 9 and rests with the full surface area of the end face against the inner side of the side wall section 10, and more particularly without necessitating a miter cut.

The remaining embossments 9 of the tray part 1 are designed in the same manner.

The end sections of the braces 7, 8 engaging in an embossment of the tray part 1 are welded therein at the end face. The partial cross-sectional illustration of FIG. 3 illustrates that the large contact surface of the embossed side wall section 10 with the frame profile 6 makes it possible to ensure particularly effective heat dissipation. In this respect, the frame profile 6, having a larger wall thickness compared to the wall thickness of the tray part 1, forms an effective heat sink. Since the contact surface of the outer side of the embossed side wall sections 10 on the frame profile 6 is limited to the size of the end of the brace 7 supported in the embossment 9, non-embossed side wall sections adjoining the embossment 9 and spaced apart from the frame profile 6 due to the gap are not heated or only heated to such an extent that there is no risk of warping of the tray part 1. This heat dissipation is furthermore favored by the fact that the frame profile 6 is an aluminum profile and therefore conducts heat particularly well. As a result, the tray part 1 does not become warped when the braces 7, 8 are welded in.

Figure 4A:
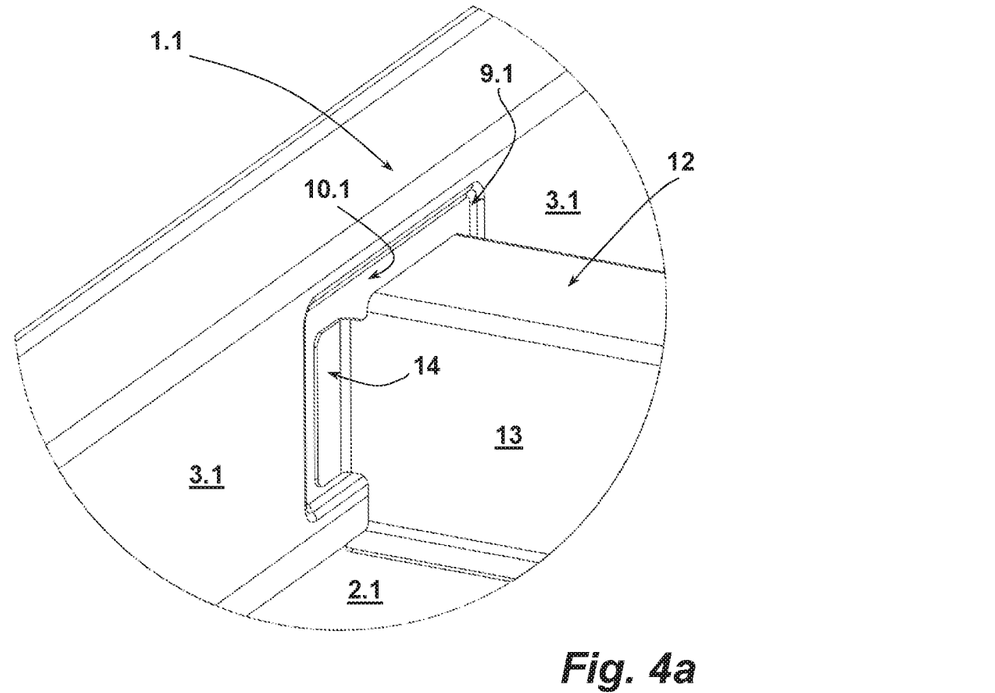
FIGS. 4a, 4b: show perspective detailed illustrations according to a further embodiment in the design of an embossment that is introduced into a side wall of a battery housing and comprises a brace supported therein with the end-face end thereof (FIG. 4a) and in a longitudinal sectional view through the brace with the frame structure shown in a cross-sectional view (FIG. 4b)
Figure 4B:
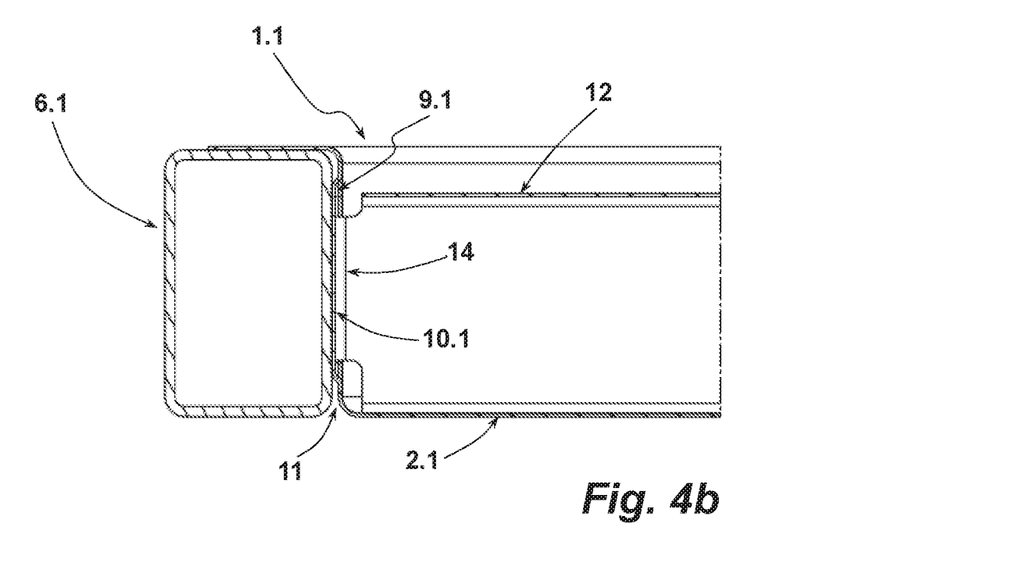

The described arrangement composed of the tray part 1 and the frame profile 6 including the braces 7, 8 based on the inclined side walls 3, 4 can also be implemented with tray parts having side walls that are not inclined. FIGS. 4a, 4b show such an embodiment. The tray part 1.1 has side walls 3.1 that are disposed at a right angle with respect to the bottom 2.1. The transition from the side wall 3.1 into the bottom 2.1 is curved by a radius. As is apparent from the sectional illustration of FIG. 4b, a gap 11 is present between the side of the frame profile 6.1 pointing to the tray part 1.1 in this embodiment as well. Only in those sections of the side wall 3.1 in which an embossment 9.1 is introduced does this have a tray volume-increasing effect, and is thus designed to be outwardly directed and supported with the embossed side wall section 10.1 thereof, this being the bottom thereof, on the frame profile 6.1.

The end of the brace 12 shown in FIG. 4a comprises a respective outwardly tilted mounting flange 14 on the two side walls 13 pointing in the longitudinal direction of the side wall 3.1. The brace 12 is supported with this mounting flange in the embossed side wall section 10.1. The depth of the embossment 9.1 is designed in order to be greater than the material thickness of the tilted mounting flange 14. In this way, such an embossment, such as the embossment 9.1., may also be used to be able to implement other mounting techniques for connecting a brace 13 to the tray part 1.1, without thereby reducing the usable volume of the tray part 1.1.

The transition from the non-embossed sections of the side wall 3.1 into the bottom of the embossment 9.1 is designed in a circumferentially inclined manner, wherein an inclination of approximately 120° is provided for in the depicted embodiment. In this respect, the side wall material, which joins the transition between the non-embossed sections of the side wall 3.1 and the embossed side wall section 10.1, includes an obtuse angle of 120° in each case with the adjoining planar side wall regions.

The height of the embossment 9.1 is adapted to the height of the brace 12. In the vertical direction, the embossment 9.1 ends in front of the curved transition between the side wall 3.1 into the bottom 2.1.

Figure 5A:
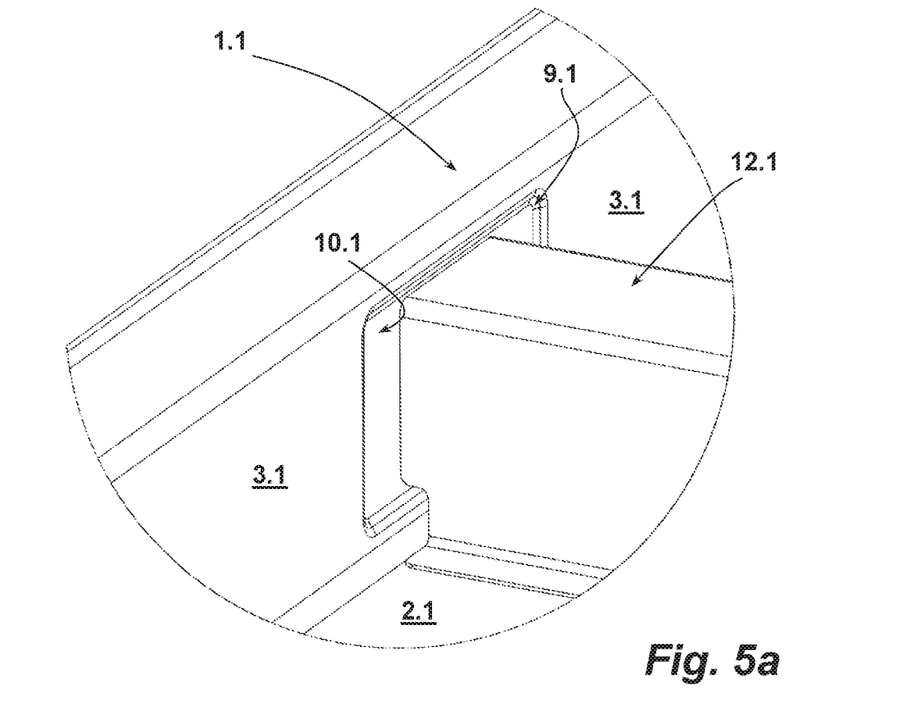
FIGS. 5a, 5b: show perspective detailed illustrations according to another embodiment in the design of an embossment that is introduced into a side wall of a battery housing and comprises a brace supported therein with the end-face end thereof (FIG. 5a) and in a longitudinal sectional view through the brace with the frame structure shown in a cross-sectional view (FIG. 5b)
Figure 5B:
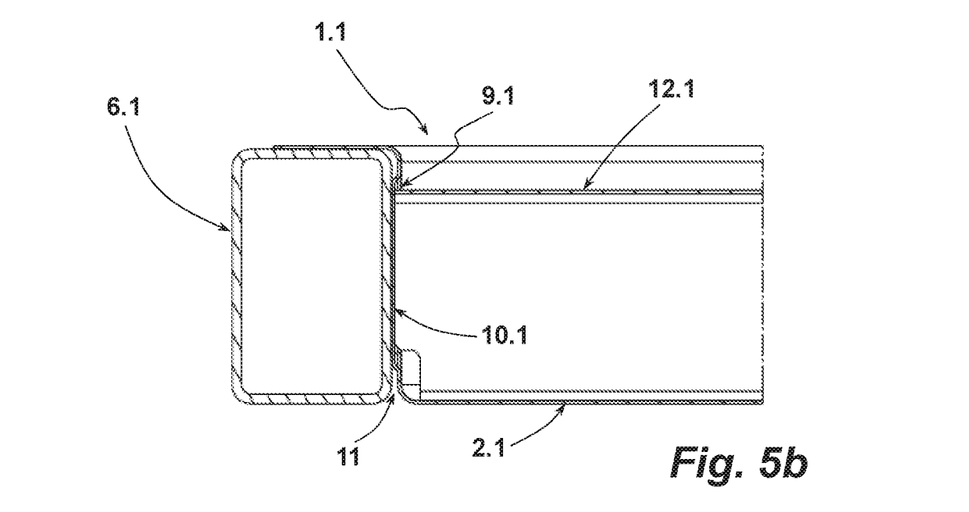

FIGS. 5a, 5b show the tray part 1.1 with the embossment 9.1, another brace 12.1 being inserted into the embossment 9.1. The brace 12.1 rests with the end-face cutting plane against the embossed side wall section 10.1. In addition, the same comments that were made with respect to the embodiment of FIGS. 4a, 4b apply to this embodiment.

Figure 6A:
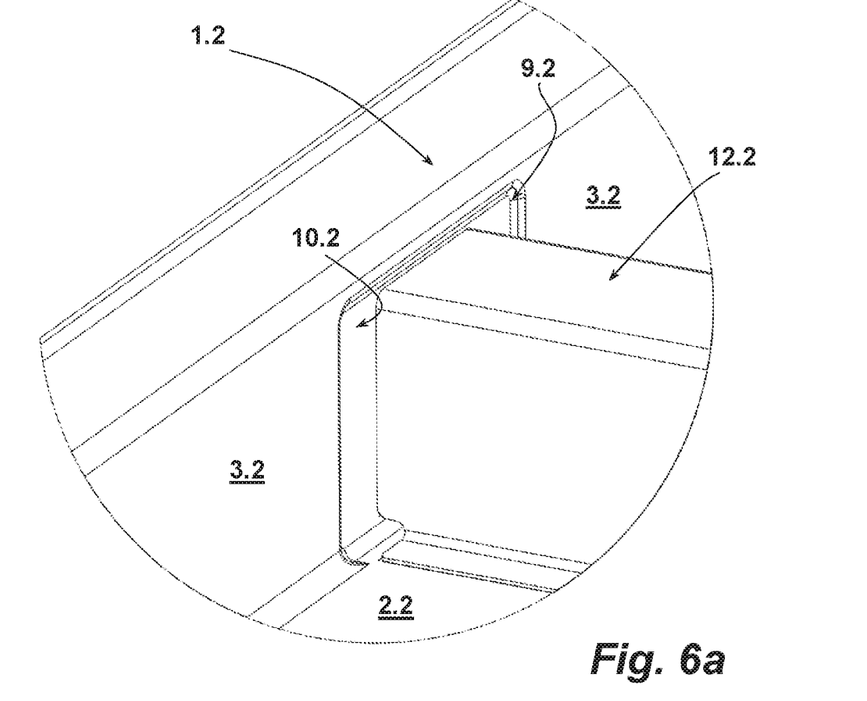
FIGS. 6a, 6b: show perspective detailed illustrations according to still another embodiment in the design of an embossment that is introduced into a side wall of a battery housing and comprises a brace supported therein with the end-face end thereof (FIG. 6a) and in a longitudinal sectional view through the brace with the frame structure shown in a cross-sectional view (FIG. 6b).
Figure 6B:
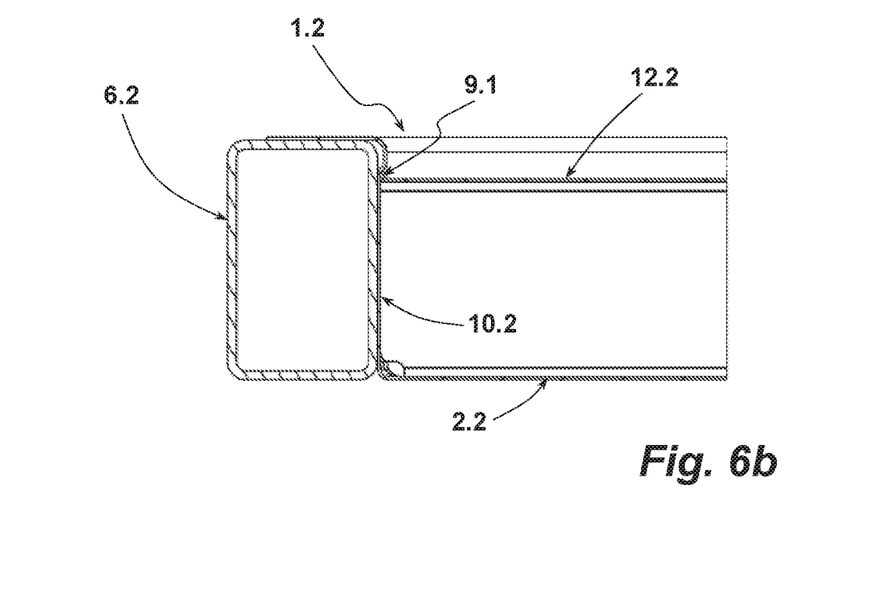

FIGS. 6a, 6b show a further tray part 1.2 comprising an embossment 9.2, which in contrast to the embossment 9.1 extends to the bottom 2.2, whereby the embossment 9.2 likewise captures the curved transition region between the side wall 3.2 and the bottom 2.2. Similar to the embodiment of FIGS. 5a, 5b, a brace 12.2 is inserted with the end face thereof into the embossment 9.2 and welded at the end face to the embossed side wall section 10.2.

Similar to the embodiments of FIGS. 5a, 5b and 6a, 6b, as is apparent from the sectional views, the embossed side wall sections 10.1 and 10.2 are supported on the frame profiles 6.1, 6.2.

A battery housing according to the present disclosure, described in terms of the above embodiments, can also be used with a frame structure that, instead of a dedicated frame profile, comprises a frame structure in which the side wall and the mounting flange of the tray part are involved. In such a frame structure, the geometry of the tray part forms part of the frame structure and is completed by one or more frame parts enclosing a hollow chamber. Such a design of the frame structure also yields the same, or at least comparable, results for welding in the end of the braces, since heat dissipation takes place both on the mounting flange side and on the bottom side into the remaining frame parts of the frame structure, and thereby prevents warpage due to heat input during welding.

Likewise, the same, or at least comparable, advantages also arise with a tray part that is produced by way of tilted components and subsequent welding, even though no draft angles, or only minor draft angles, are present there. The ends of the braces thus do not require subsequent processing by way of mitering, the deformation path is likewise extended compared to conventional designs due to a kind of buffer zone, and the reinforced local joining surfaces in the form of the embossments considerably reduce warpage, despite welding-induced heat input.

The invention was described based on exemplary embodiments. A person skilled in the art will derive numerous embodiments for implementing the invention without departing from the scope of the present claims. While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS 1, 1.1, 1.2 tray part
2, 2.1, 2.2 bottom
3, 3.1, 3.2 side wall
4 side wall
5 mounting flange
6, 6.1, 6.2 frame profile
7 longitudinal brace
8 transverse brace
9, 9.1, 9.2 embossment
10, 10.1, 10.2 side wall section
11 gap
12 brace
13 side wall
14 mounting flange

The invention claimed is:

1. A battery housing for a vehicle driven by an electric motor, comprising:
   a tray part having a bottom and side walls integrally formed thereon;
   a frame structure surrounding the tray part on the outside;
   a gap remaining between the side walls and the frame structure disposed on the outside thereof;
   wherein at least two side walls of the tray part situated opposite one another with respect to a tray volume of the tray part each comprise at least one embossment extending across a certain side wall section and pointing away from the tray volume, the at least one embossment supported on and resting against the frame structure; and
   a brace disposed in the tray part, the brace supported with end-face ends thereof in mutually opposing embossments of the at least two sides walls of the tray part.

2. The battery housing of claim 1, wherein a planar extension of the at least one embossment is greater than the end-face end surface of a brace supported therein.

3. The battery housing of claim 1, wherein the embossments do not include a curved transition region between the side walls and the bottom of the tray part.

4. The battery housing of claim 1, wherein non-embossed side wall sections of the side walls are tapered in a direction of the bottom, forming a draft, and the embossments are designed so that an embossed side wall section is disposed at a right angle relative to the bottom of the tray part.

5. The battery housing of claim 4, wherein the embossments extend across an entire height of the side walls.

6. The battery housing of claim 1, wherein the frame structure is formed by a frame profile that surrounds the tray part and is composed of individual profile sections, and embossed side wall sections rest against sides of the frame structure which face toward the tray part.

7. The battery housing of claim 6, wherein the profile sections of the frame profile are lightweight metal hollow chamber profiles.

8. The battery housing of claim 1, wherein the frame structure, at least by the side walls of the tray part, is designed as an integral part of the sides walls.

9. The battery housing of claim 1, wherein the embossments are implemented with a radius of less than 10 mm.

10. The battery housing of claim 1, wherein side wall material joining the embossments with adjacent non-embossed side wall sections forms an obtuse angle with a bottom of an embossment on one side and with the adjacent non-embossed side wall sections on another side.

11. The battery housing of claim 10, wherein the obtuse angle is greater than 120°.

12. The battery housing of claim 1, wherein embossments on opposing side walls of the tray part are disposed mirror-symmetrically with respect to a tray part transverse plane situated between said opposing side walls.

13. The battery housing of claim 1, wherein all mutually opposing side walls have an embossment.

14. The battery housing of claim 1, wherein the tray part is a deep-drawn steel part.

15. The battery housing of claim 1, wherein end faces of the end-face ends of the brace form a right angle with upper sides of the brace.

16. The battery housing of claim 1, wherein the end-face ends of the brace are welded in the embossments to the side walls.

17. The battery housing of claim 1, wherein one or more braces extending in one direction are formed of a plurality of brace segments, the plurality of brace segments joined to one another by way of a joining element, wherein the joining element, when a load is applied during a collision, causes a continuous force transmission between opposing side walls of the tray part.

* * * * *